United States Patent

Cady et al.

[11] Patent Number: 5,282,402
[45] Date of Patent: Feb. 1, 1994

[54] MACHINE TOOL TAILSTOCK

[75] Inventors: Raymond C. Cady, Horseheads; Terrence M. Sheehan, Elmira; James P. Peris, Horseheads; Robert D. Allington, Wellsburg, all of N.Y.

[73] Assignee: Hardinge Brothers, Inc., New York, N.Y.

[21] Appl. No.: 868,165

[22] Filed: Apr. 14, 1992

[51] Int. Cl.$^5$ .................. B23B 3/00; B23B 21/00; B23B 23/00
[52] U.S. Cl. ........................ 82/117; 82/134; 82/148; 82/154
[58] Field of Search ............ 82/1.11, 117, 118, 132, 82/133, 134, 135, 148, 154

[56] References Cited

U.S. PATENT DOCUMENTS

| | | |
|---|---|---|
| 1,709,118 | 4/1929 | Class . |
| 2,172,999 | 9/1939 | Hoelscher . |
| 2,653,503 | 9/1953 | Cormier .................. 82/148 |
| 3,106,041 | 12/1964 | Hanna .................... 82/148 |
| 3,232,143 | 2/1966 | Schurger et al. . |
| 3,589,219 | 6/1971 | Parsons .................. 82/154 |
| 3,636,804 | 1/1972 | Wyles . |
| 3,774,483 | 11/1973 | Ito . |
| 4,335,633 | 6/1982 | Boffelli .................. 82/148 |
| 4,506,569 | 3/1985 | Brown et al. ........... 82/117 |
| 4,807,501 | 2/1989 | Leight et al. .......... 82/148 |
| 4,852,434 | 8/1989 | Bald ...................... 82/118 |
| 4,926,723 | 5/1990 | Lothammer ............. 82/118 |

Primary Examiner—William E. Terrell
Attorney, Agent, or Firm—Cushman, Darby & Cushman

[57] ABSTRACT

A machine tool comprises a base, a spindle operably associated with the base, a work holder operably associated with the spindle for securing a workpiece to the spindle, and a tailstock operably secured to the base. The tailstock includes a slideway and a tailstock body slidably secured to the slideway. The tailstock body is movable on the slideway between a home position away from the workpiece and a work engaging position. A limit switch and trip members associated with the tailstock, and a hydrulic circuit are provided for controlling the movement of the tailstock body from the home position to an intermediate position prior to the work engaging position at an initial feed rate and from the intermediate position to the work engaging position at a subsequent feed rate where the initial feed rate is greater than the subsequent feed rate.

6 Claims, 5 Drawing Sheets

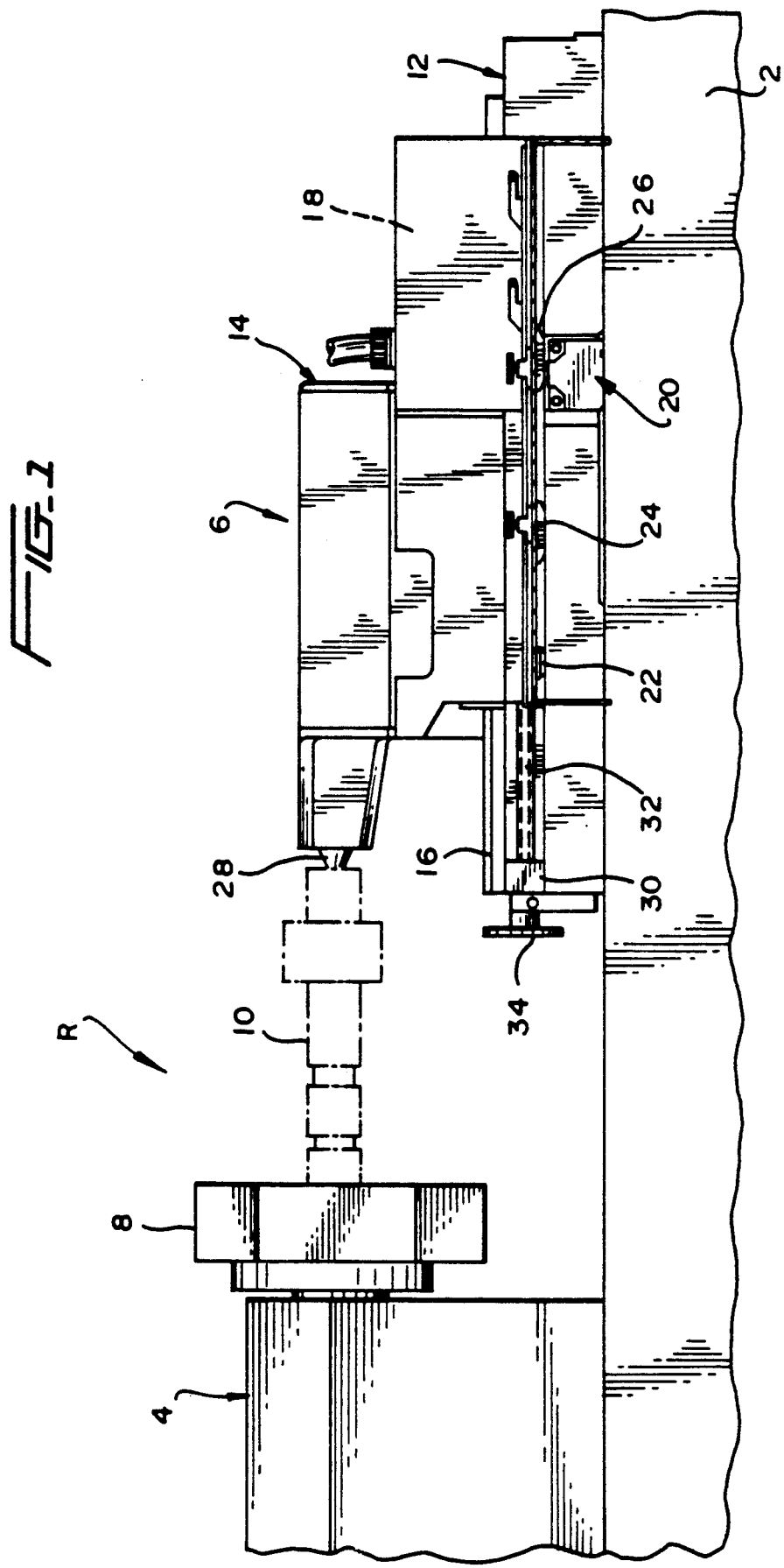

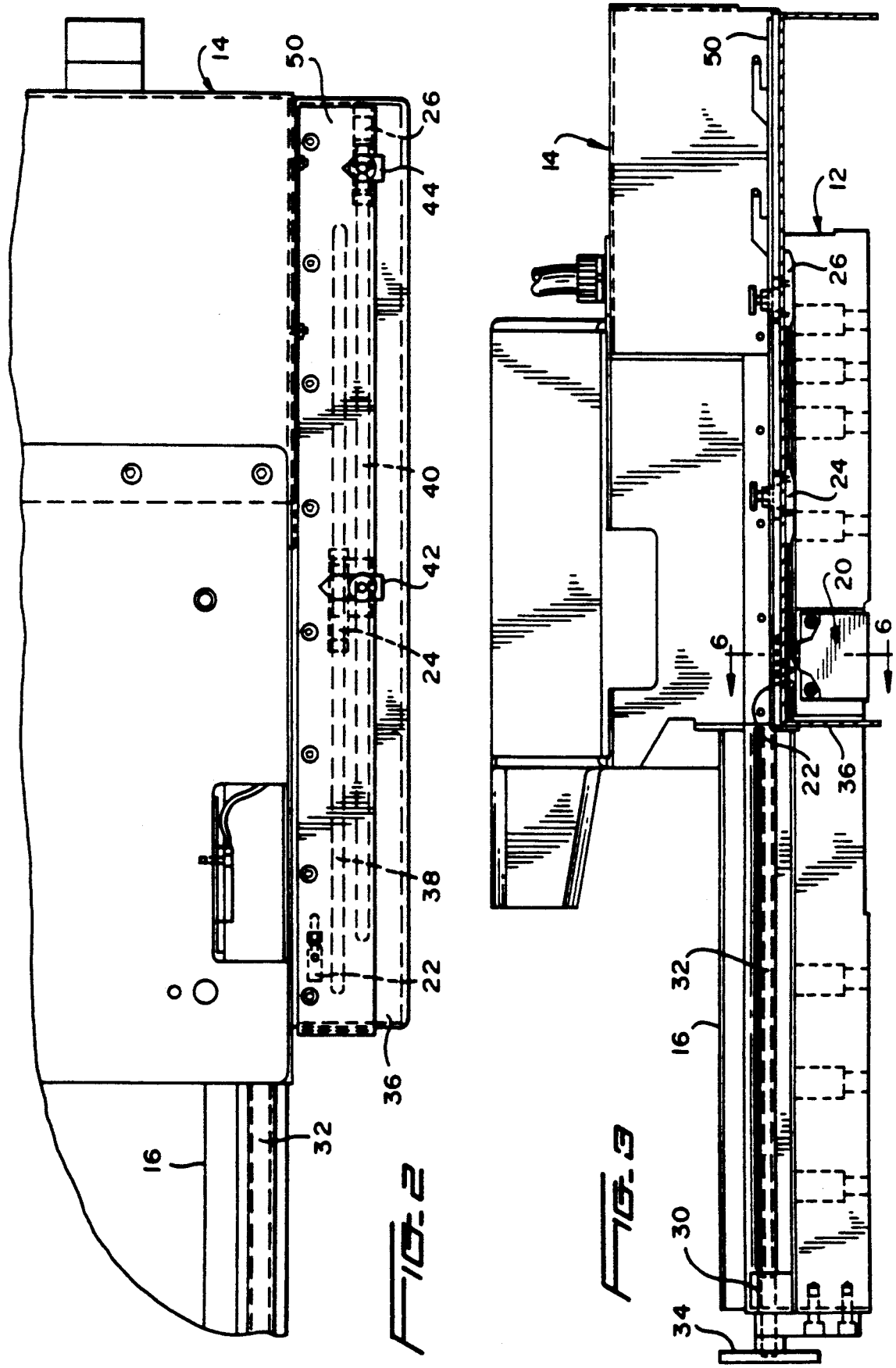

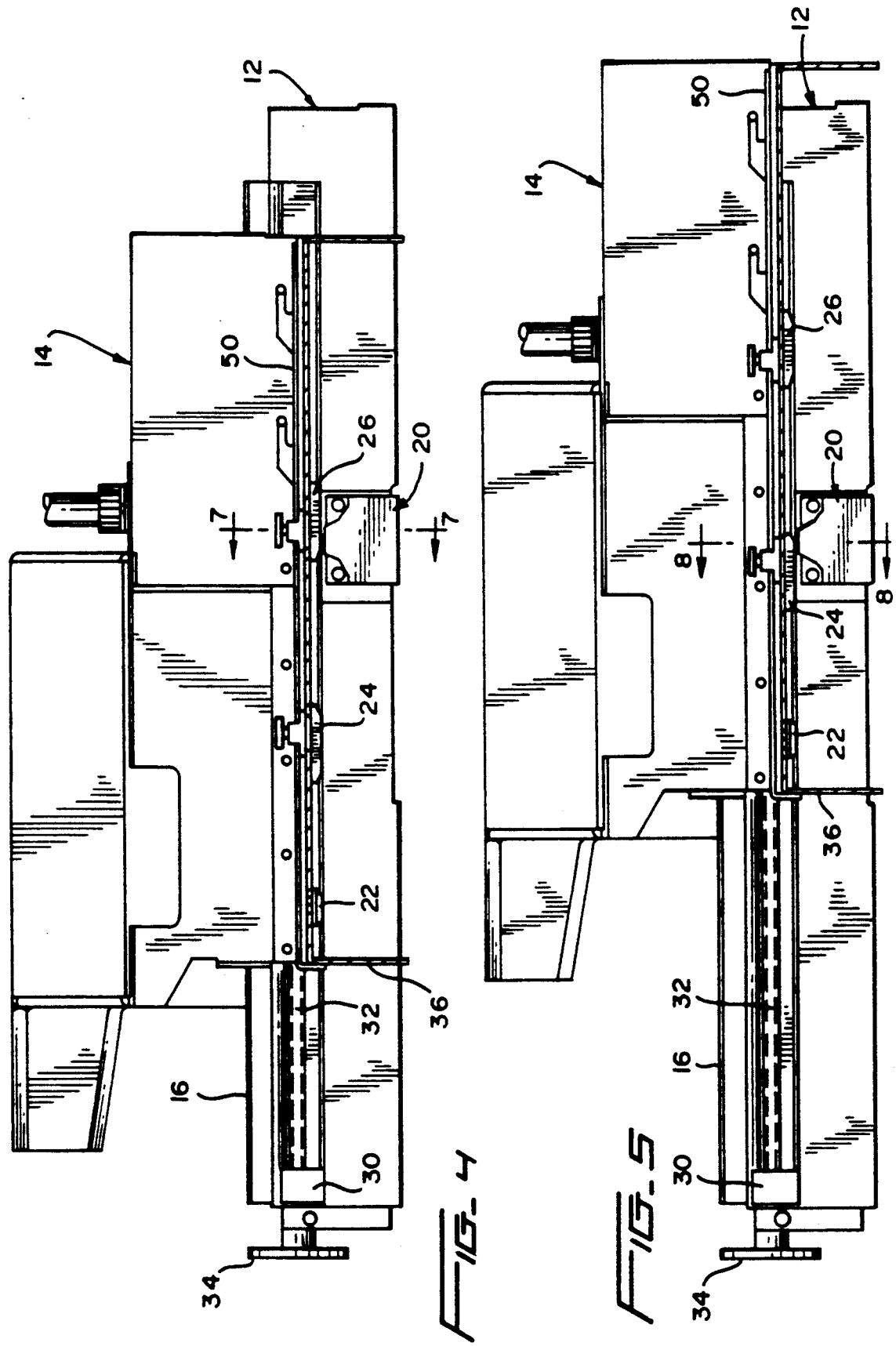

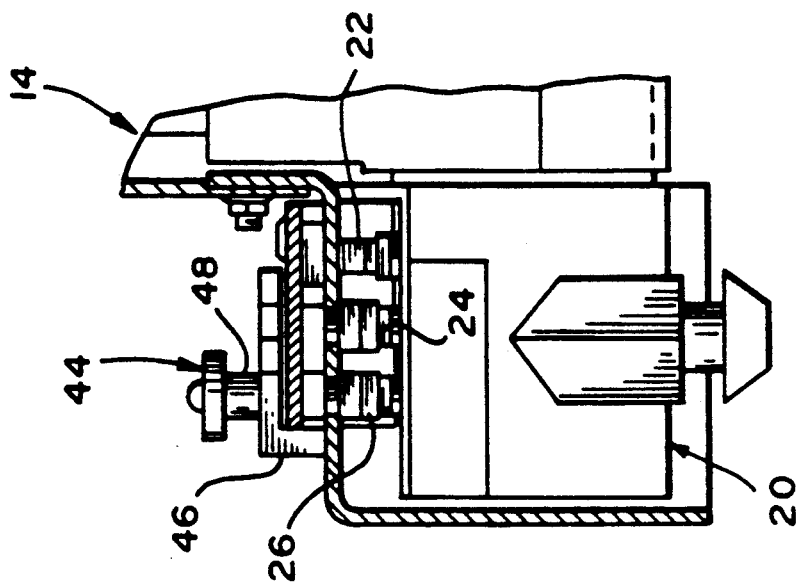
FIG_8
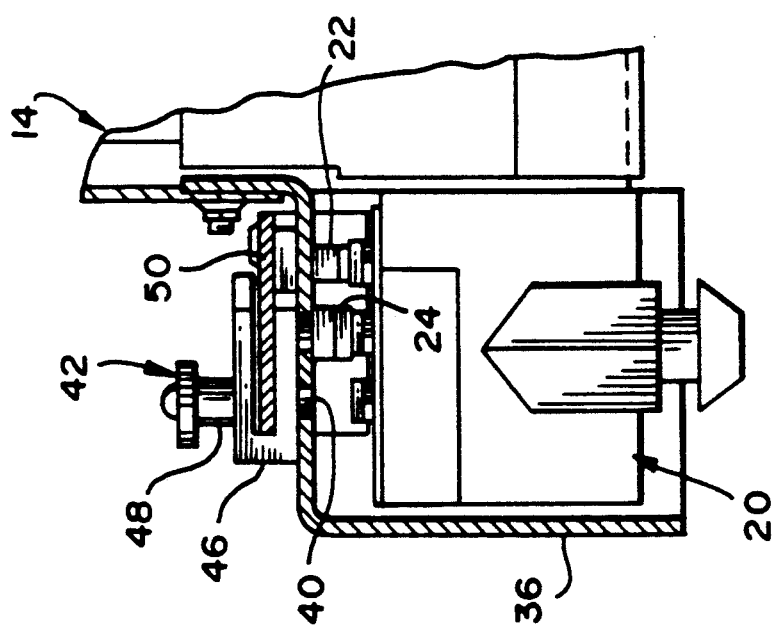
FIG_7
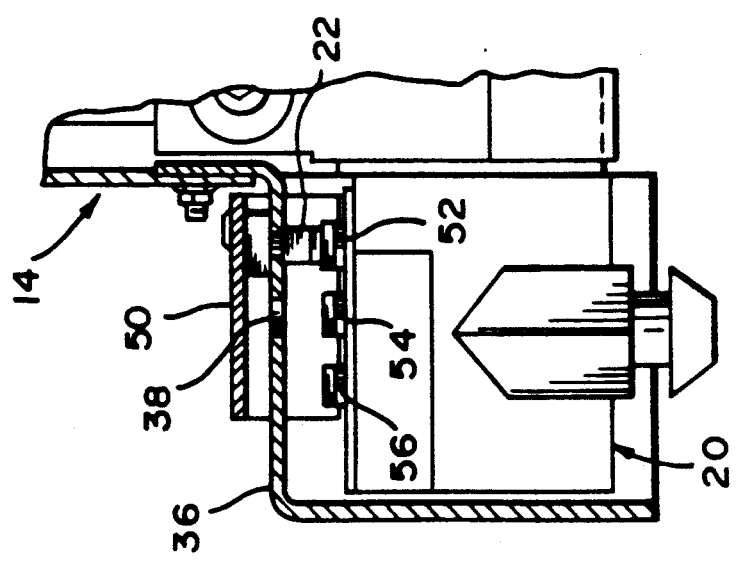
FIG_6

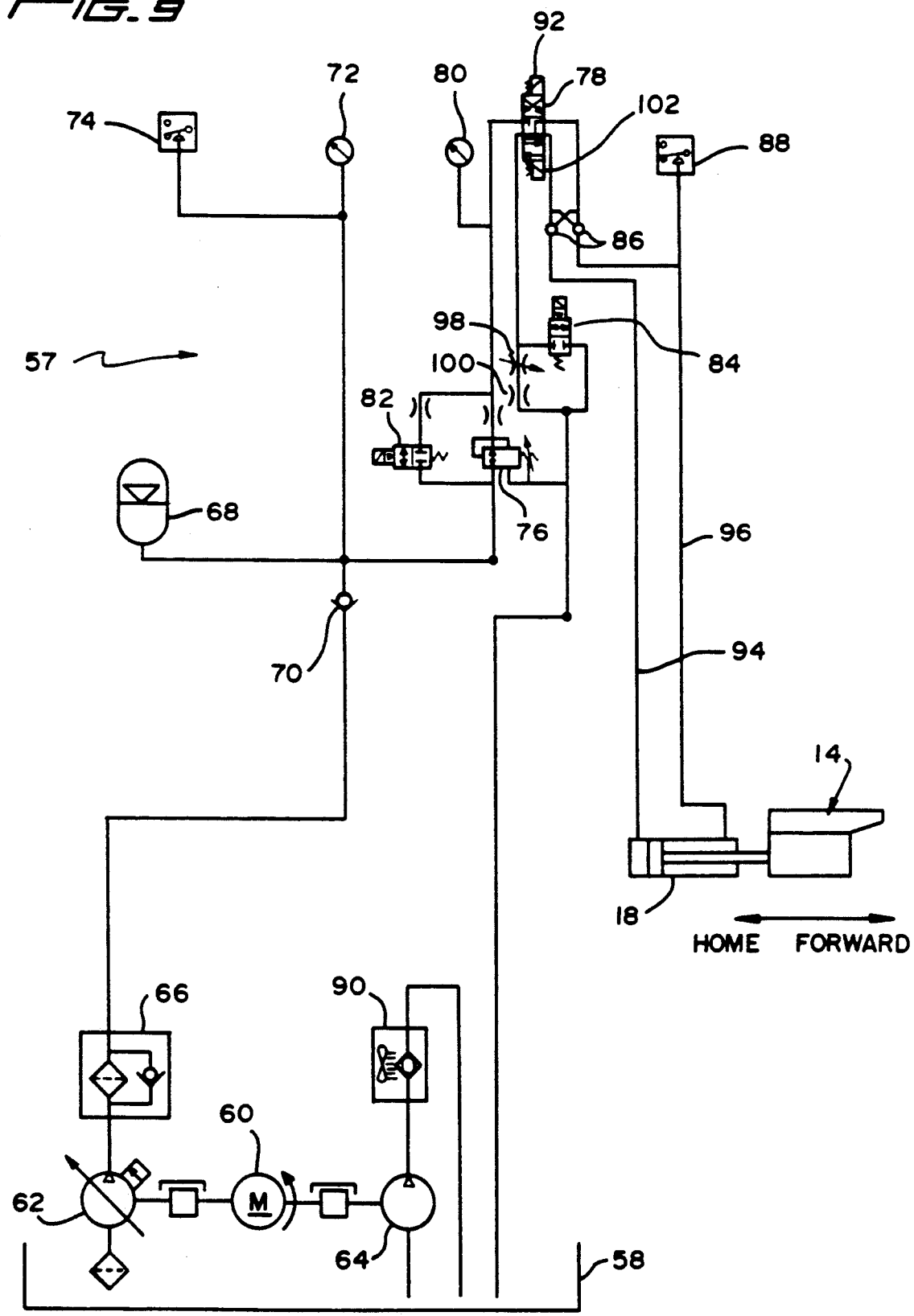

MACHINE TOOL TAILSTOCK

FIELD OF THE INVENTION

The present invention relates generally to a machine tool and particularly to a machine tool tailstock with adjustable home position and variable in-feed rates.

BACKGROUND OF THE INVENTION

In a typical machine tool, such as a lathe, a work piece is gripped at one end by a work holder, such as a chuck or a collet, while the other end is supported by a tailstock. The tailstock is supported for sliding movement relative to the base of the machine tool. The tailstock also includes a quill that is supported for sliding movement relative to the tailstock body. During machining operation of a part, there is continual need to disengage the tailstock from the work piece or otherwise move the tailstock away from the work piece to its home position so that it would be out of the way of an operator. Typically, a tailstock will only have one home position which is permanently fixed. Thus, when the part being machined requires the tailstock to be moved away only a short distance and because of the limitation of the fixed home position, the operator loses valuable time when he moves the tailstock all the way to the fixed home position.

There is therefore a need for a tailstock that has an adjustable home position such that a tailstock does not have to be moved all the way to its permanent home position when only a short distance will suffice.

Typically a tailstock is moved toward the workpiece from its home position at a fixed speed which is normally slow to prevent the tailstock from damaging the workpiece. Valuable time is lost during this process, especially when the home position is further from the workpiece than necessary. There is therefore a need for a tailstock that can be moved part-way toward the workpiece at a relatively faster feed rate and then moved the rest of the way at a relatively slower feed rate until the tailstock engages the workpiece.

OBJECTS AND SUMMARY OF THE INVENTION

It is an object of the present invention to provide a machine tool having a tailstock that has an adjustable closer home position relative to the workpiece such that the tailstock need not be moved to its distant normal home position when required by the part being machined.

It is another object of the present invention to provide a machine tool having a tailstock that travels on a relatively faster feed rate toward the workpiece up to a certain point prior to engagement with the workpiece and subsequently travels at a relatively lower feed rate until it engages the workpiece.

It is yet another object of the present invention to provide a machine tool with a tailstock that is movable away from the work piece to its home position at a relatively faster rate.

It is another object of the present invention to provide a machine tool with a tailstock having an initial relatively faster feed rate over an adjustable distance.

It is still another object of the present invention to provide a machine tool with a tailstock that moves out of the way from the workpiece but not all the way to its distant normal home position.

In summary, the present invention provides a machine tool with a tailstock that provides relatively faster cycling time.

These and other objects of the present invention will become apparent from the following detailed description.

BRIEF DESCRIPTIONS OF THE DRAWINGS

FIG. 1 is a fragmentary, partly in cross-section, side elevational view of a machine tool showing a tailstock engaging a work piece (shown in phantom lines).

FIG. 2 is an enlarged fragmentary top view of a portion of the tailstock shown in FIG. 1.

FIG. 3 is an enlarged fragmentary, partly in cross-section, side elevational view of the tailstock in its normal home position.

FIG. 4 is an enlarged fragmentary, partly in cross-section, side elevational view of the tailstock shown of FIG. 1, showing the tailstock in a position where it would normally engage the work piece.

FIG. 5 is an enlarged fragmentary, partly in cross-section, side elevational view of the tailstock of FIG. 1, showing the tailstock in its adjustable home position.

FIG. 6 is a cross-sectional view taken along lines 6—6 of FIG. 3.

FIG. 7 is a cross-sectional view taken along lines 7—7 of FIG. 4.

FIG. 8 is an enlarged cross-sectional view taken along lines 8—8 of FIG. 5.

FIG. 9 is a schematic diagram of a hydraulic circuit for driving the tailstock in accordance with the present invention.

DETAILED DESCRIPTION OF THE INVENTION

A machine tool in accordance with the present invention is disclosed in FIG. 1. The machine tool comprises a base 2 sporting a spindle assembly 4 and a tailstock 6. The spindle assembly 4 has a work holder 8 for securely gripping a workpiece 10.

The tailstock 6 includes a sub-base 12 and a tailstock body 14 slidable on the sub-base 12 on guideways or slideways 16. A double acting piston-cylinder assembly 18 (see FIG. 9), operably secured to the sub-base 12 and the tailstock body 14, slidably drives the tailstock body 14 along the guideways 16. A limit switch 20 operably secured to the sub-base 12 cooperates with trip dogs 22, 24 and 26 that are secured to the tailstock body 14 to control the sliding movement of the tailstock body 14 relative to the sub-base 12. The tailstock 6 has a quill 28 that engages the work piece 10, thereby to support the work piece at its remote end from the work holder 8.

An adjustable stop block 30 operably secured to a threaded rod 32 and a hand wheel 34 provide a solid stop for the tailstock body 14 for delicate parts or for safety in case the hydraulic controls malfunction.

The trip dog 22 is fixedly secured to a skirt 36 that is fixedly secured to the tailstock body 14, as best shown in FIGS. 2 and 6. The trip dogs 24 and 26 are moveable along respective slots 38 and 40. Clamp assemblies 42 and 44 are each associated with the respective trip dogs 24 and 26 to permit locking each of the trip dogs on any desired point along the respective slots 38 and 40. Each of the clamp assemblies 42 and 44 comprises a C-shaped bracket 46 and a thumb screw 48. A spacer plate 50 operably secured to the skirt 36 cooperates with each bracket 46 and thumb screw 48 such that the respective trip dogs 24 and 26 can be secured on any point along the respective slots 38 and 40, as best shown in FIGS. 2, 7 and 8. Each bracket 46 is slidably moveable with respect to the skirt 36 and the spacer plate 50 and lockable by means of the thumb screw 48.

The limit switch 20 includes contacts 52, 54 and 56 that cooperate with trip dogs 22, 24 and 26, respectively, as best shown in FIGS. 6-8.

The trip dog 22 is associated with the normal home position of the tailstock body 14, as best shown in FIG. 3. In the normal or solid home position, the tailstock body 14 is farthest away from the work piece 10.

The trip dog 26 is associated with work engaging position of the tailstock body 14, as best shown in FIGS. 1 and 4.

The trip dog 24 is associated with an adjustable home position where the tailstock body 14 is retracted away from the work piece 10 but not all the way to the solid home position associated with the trip dog 22, as best shown in FIG. 5.

A hydraulic circuit 57 used in the present invention is disclosed in FIG. 9. The circuit 57 includes fluid reservoir 58. A motor 60 drives pumps 62 and 64 that are in communication with the fluid in the reservoir 58. A pressure filter 66 is connected to the output of the pump 62. An accumulator 68 is operably connected to the discharge side of the pressure filter 66 through a check valve 70 to maintain the system pressure of the circuit 57 at a certain level as indicated by a pressure gauge 72. A system pressure switch 74 maintains the system pressure at the preselected level by controlling the pump 62.

A pressure regulator 76 connects to the output of the accumulator 68 and to a four-way valve 78. A pressure gauge 80 provides a read-out of the pressure available to the tailstock piston cylinder 18. A by-pass valve 82 is disposed in parallel to the pressure regulator 76. A two-way valve 84 is connected to the drain side of the valve 78. Pilot operated check valves 86 are operably connected between the piston/cylinder 18 and the valve 78.

An oil cooler 90 is operably connected to the pump 64 to provide cooling means for the fluid in the reservoir 58.

OPERATION

In operation, the operator will decide where to position the adjustable home trip dog 24 and the rapid traverse trip dog 26, depending on the size of the workpiece. If the adjustable home trip dog 24 is not to be used, it is moved all the way towards the spindle 4 next to the solid home trip dog 22. Otherwise, the trip dog 24 is positioned between the solid home trip dog 22 and the rapid traverse trip dog 26, as best shown in FIGS. 1-5. Additionally, the operator will also adjust the stop-block 30 to provide a solid stop to the tailstock body 14 as a back-up for or in lieu of the pressure switch 88. The solid stop block 30 is typically used when delicate parts or tubing is held with the tailstock and requires less pressure than the lowest available system pressure.

With the tailstock body 14 in the solid home position, where the trip dog 22 is in engagement with its respective contact 52 of the limit switch 20, solenoid 92 is energized to open the valve 78, thereby causing pressurized fluid to flow to line 94 and into the piston cylinder 18, as best shown in FIG. 9. At the same time, fluid is forced out through line 96 through the valves 78 and 84 and into the reservoir 58. The valve 84 is normally open so that the flow orifices 98 and 100 are bypassed, thereby providing increased fluid flow and power to the piston cylinder 18 and providing rapid travel for the tailstock body 14 toward the work piece 10.

The tailstock body 14 will continue to rapid feed until the trip dog 26 engages its respective contact 56. At this point, when the tailstock body 14 is some short distance away from the work piece, the bypass valve 84 is closed, forcing the fluid to flow through the orifices 98 and 100, thereby slowing the fluid flow to through the lines 94 and 96. The tailstock body 14 will therefore continue to feed toward the workpiece at a slower speed. The contact 56 is operably connected to the valve 84 through a controller (not shown) of the machine tool R to command the valve 84 to close, thereby forcing the return fluid to flow through the orifices 98 and 100. When the workpiece is engaged, pressure in the line 96 will reach a certain level, at which point the solenoid 92 is de-energized, bringing the valve 78 to its neutral open position. The check valves 86 maintain fluid pressure within the piston cylinder 18, thereby permitting the tailstock body 14 to maintain proper pressure against the workpiece 10.

After the machining of the work piece is completed, the tailstock body 14 is moved away therefrom by actuating a solenoid 102 of the valve 78. At the same time, the valve 84 will have been in the open position to bypass the orifices 98 and 100. Pressurized fluid is then admitted to the line 96 to the piston cylinder 18, thereby moving the tailstock body 14 away from the work piece at a relatively rapid rate until the adjustable home trip dog 24 engages its respective contact 54 of the limit switch 20. At this point, the signal from the contact 54 is effective to cause the valve 78 to revert to its neutral position, as best shown in FIG. 5.

A person of ordinary skill in the art will understand that rapid cycling of the tailstock body 14 is accomplished, since the distance between the adjustable home trip dog 24 and the solid home trip dog 22 is not traversed. At the same time, the tailstock body 14 is taken out of the way of the operator.

A person of ordinary skill in the art will understand that the tailstock body 14 provides a relatively rigid support when fully engaged against the workpiece 10, since an extensible and cantilevered quill is not used, as in the prior art.

While the invention is described in relation to a tailstock, one of ordinary skill in the art will understand that the invention described above will also be applicable to any carriage, such as a tool holder carriage, that continually moves toward and away from the workpiece during the course of machining a part, etc.

A person of ordinary skill in the art will understand that other means for effecting the movement of the tailstock body 14 at different feed rates can be accomplished by other drive mechanisms, such a screw drive with variable speed motor.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A machine tool, comprising:
   a) a base;
   b) a spindle operably associated with said base;

c) a work holder operably associated with said spindle for securing a workpiece to said spindle;
d) a tailstock operably secured to said base;
e) said tailstock including a slideway and a tailstock body slidably secured to said slideway;
f) said tailstock body being movable on said slideway between a first home position away from the workpiece and a work engaging position;
g) a switch operably associated with said tailstock body and said slideway;
h) a first trip member operably associated with an intermediate position of said tailstock body prior to said work engaging position;
i) second and third trip members operably associated with said first and second home positions of said tailstock body, respectively;
j) means operably associated with said switch and said first, second and third trip members for moving said tailstock body between one of said first and second home positions and said work engaging position such that said tailstock body moves at a first feed rate from one of said first and second home positions until said first trip member engages said switch and at a second feed rate until said tailstock body engages the workpiece at a predetermined pressure and such that said tailstock body moves at a third feed rate away from said work engaging position until said one of said second and third trip members engages said switch, said first and third feed rates being greater than said second feed rate.

2. A machine tool as in claim 1, wherein:
a) said switch is disposed between said first home position and said work engaging position.

3. A machine tool as in claim 2, wherein:
a) said switch is secured to said slideway.

4. A machine tool as in claim 1, wherein:
a) said first and third trip members are positionably adjustable.

5. A machine tool as in claim 1, wherein:
a) said first, second and third trip members are secured to said tailstock body.

6. A machine tool as in claim 1, wherein:
a) said second trip member is fixed to said tailstock body;
b) said tailstock body includes a pair of parallel slots; and
c) said first and third trip members are respectively slidably secured to said slots.

* * * * *